United States Patent
Lin et al.

(10) Patent No.: US 10,451,825 B1
(45) Date of Patent: Oct. 22, 2019

(54) LOCKING ARRANGEMENT FOR PLUGGABLE OPTICAL SUBASSEMBLY MODULES

(71) Applicant: Applied Optoelectronics, Inc., Sugar Land, TX (US)

(72) Inventors: Kai-Sheng Lin, Sugar Land, TX (US); Ziliang Cai, Richmond, TX (US); Hao-Chiang Cheng, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 16/167,864

(22) Filed: Oct. 23, 2018

(51) Int. Cl.
  *G02B 6/42* (2006.01)
  *H04B 10/40* (2013.01)
  *G02B 6/38* (2006.01)

(52) U.S. Cl.
  CPC ........... *G02B 6/4261* (2013.01); *G02B 6/387* (2013.01); *G02B 6/3885* (2013.01); *G02B 6/3893* (2013.01); *H04B 10/40* (2013.01)

(58) Field of Classification Search
  None
  See application file for complete search history.

(56) References Cited

U.S. PATENT DOCUMENTS

| 2005/0191892 A1* | 9/2005 | Ishigami | G02B 6/4201 439/372 |
| 2012/0106902 A1* | 5/2012 | Thirugnanam | G02B 6/4246 385/92 |

* cited by examiner

*Primary Examiner* — Chad H Smith
(74) *Attorney, Agent, or Firm* — Grossman Tucker Perreault & Pfleger, PLLC; Norman S. Kinsella (57) ABSTRACT

The present disclosure is generally directed to an optical transceiver module with a locking arrangement that allows the optical transceiver module to be releasably coupled into an associated receptacle of an optical transceiver cage. The locking arrangement includes a handle member with teeth configured to engage notches of an actuating member to allow rotational movement of the handle to be translated into linear movement by the actuating member. The linear movement of the actuating member may be independent of the housing of the optical transceiver module, and as the handle is transitioned from a locked position to a release position such movement of the actuating member can urge release of the locking members of the optical transceiver cage by way of the tab portions of the actuating member. A user may then supply a force, e.g., a pulling force, to remove the unlocked subassembly module from the receptacle.

17 Claims, 7 Drawing Sheets

LOCKING ARRANGEMENT FOR PLUGGABLE OPTICAL SUBASSEMBLY MODULES

TECHNICAL FIELD

The present disclosure relates to optical communications and more particularly, to a locking arrangement that allows a user to unlock and remove an optical subassembly from a receptacle of an optical transceiver cage by rotating a handle member from a locked to unlocked position and supplying a force, e.g., pulling force, to draw the optical subassembly from the receptacle.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to thermal management, insertion loss, and manufacturing yield.

Optical transceiver modules generally include one or more transmitter optical subassemblies (TOSAs) for transmitting optical signals. Some optical transceiver systems use cage-type mountings that provide receptacles for receiving pluggable transceiver modules. As optical transceiver technology continues to scale, mechanisms for retaining pluggable optical transceiver modules raise challenges due to the space constraints of the cages and optical transceiver modules as well as the ever-increasing desire to increase cage density, e.g., channel count per square inch.

BRIEF DESCRIPTION OF THE DRAWINGS

These and other features and advantages will be better understood by reading the following detailed description, taken together with the drawings wherein.

DETAILED DESCRIPTION

The present disclosure is generally directed to an optical transceiver module with a locking arrangement that allows the optical transceiver module to be releasably coupled into an associated receptacle of an optical transceiver cage. The locking arrangement includes a handle member with teeth configured to engage notches of an actuating member, thus allowing rotational movement of the handle between a locked and release position to be translated into linear movement by the actuating member. The actuating member includes arm portions that may be disposed at least partially within a track defined by the housing of the optical subassembly, with each arm portion having a tab portion that protrudes at least partially from the track to displace associated locking members of the optical transceiver cage when the handle is rotated to the release position. Thus, the linear movement of the actuating member is independent of the housing of the optical transceiver module, e.g., the housing can remain stationary within the receptacle, and as the handle is transitioned from a locked position to a release position, the rotational movement translates to linear movement of the actuating member to urge release of the locking members of the optical transceiver cage by way of the tab portions of the actuating member. A user may then supply a force, e.g., a pulling force, to remove the unlocked subassembly module from the receptacle.

An optical transceiver module with a locking arrangement consistent with the present disclosure may therefore be mechanically released from an associated optical transceiver cage without necessarily severing electrical connectivity with the same. This advantageously avoids loss of service in the event a user/technician rotates the handle, but then decides not to pull the unlocked optical transceiver module. In addition, a locking arrangement consistent with the present disclosure may have a low-profile configuration whereby components of the locking arrangement, such as the arm portions, may be sandwiched between the housing of the optical subassembly and the associated cage. Therefore, the overall dimensions of the optical subassembly may comport with a desired standard, e.g., a pluggable optical subassembly standard, while providing a relatively simple mechanical locking arrangement that allows a user to perform, essentially, one single fluid movement to rotate the handle to the release position and smoothly withdraw/pull an optical subassembly from an associated receptacle. The locking arrangement may further include spring members to hold the actuating member, and by extension the handle member, in a locked position when the optical subassembly is disposed within an associated receptacle of an optical transceiver cage.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated characteristic. To provide one non-limiting numerical example to quantify "substantially," minor variation may cause a deviation of up to and including ±5% from a particular stated quality/characteristic unless otherwise provided by the present disclosure.

Figure 1A:
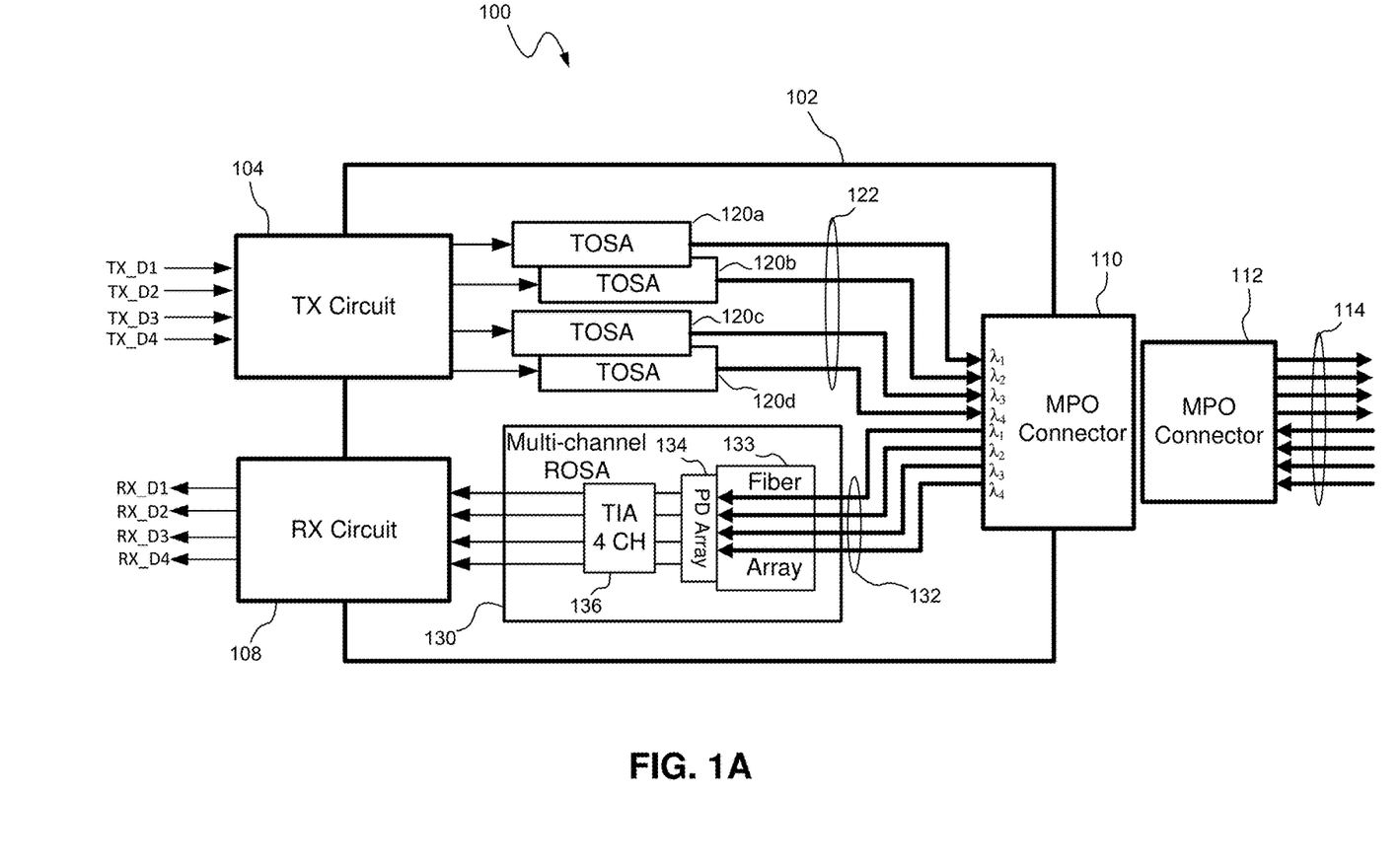
FIGS. 1A and 1B are block diagrams of multi-channel optical transceivers, consistent with embodiments of the present disclosure.

Referring to the Figures, FIG. 1A, an optical transceiver 100, consistent with embodiments of the present disclosure, is shown and described. In this embodiment, the optical transceiver 100 transmits and receives four (4) channels using four different channel wavelengths (λ1, λ2, λ3, λ4) and may be capable of transmission rates of at least about 25 Gbps per channel. In one example, the channel wavelengths λ1, λ2, λ3, λ4 may be 1270 nm, 1290 nm, 1310 nm, and 1330 nm, respectively. Other channel wavelengths are within the scope of this disclosure including those associated with local area network (LAN) wavelength division multiplexing (WDM). The optical transceiver 100 may also be capable of transmission distances of 2 km to at least about 10 km. The optical transceiver 100 may be used, for example, in internet data center applications or fiber to the home (FTTH) applications.

Figure 6:
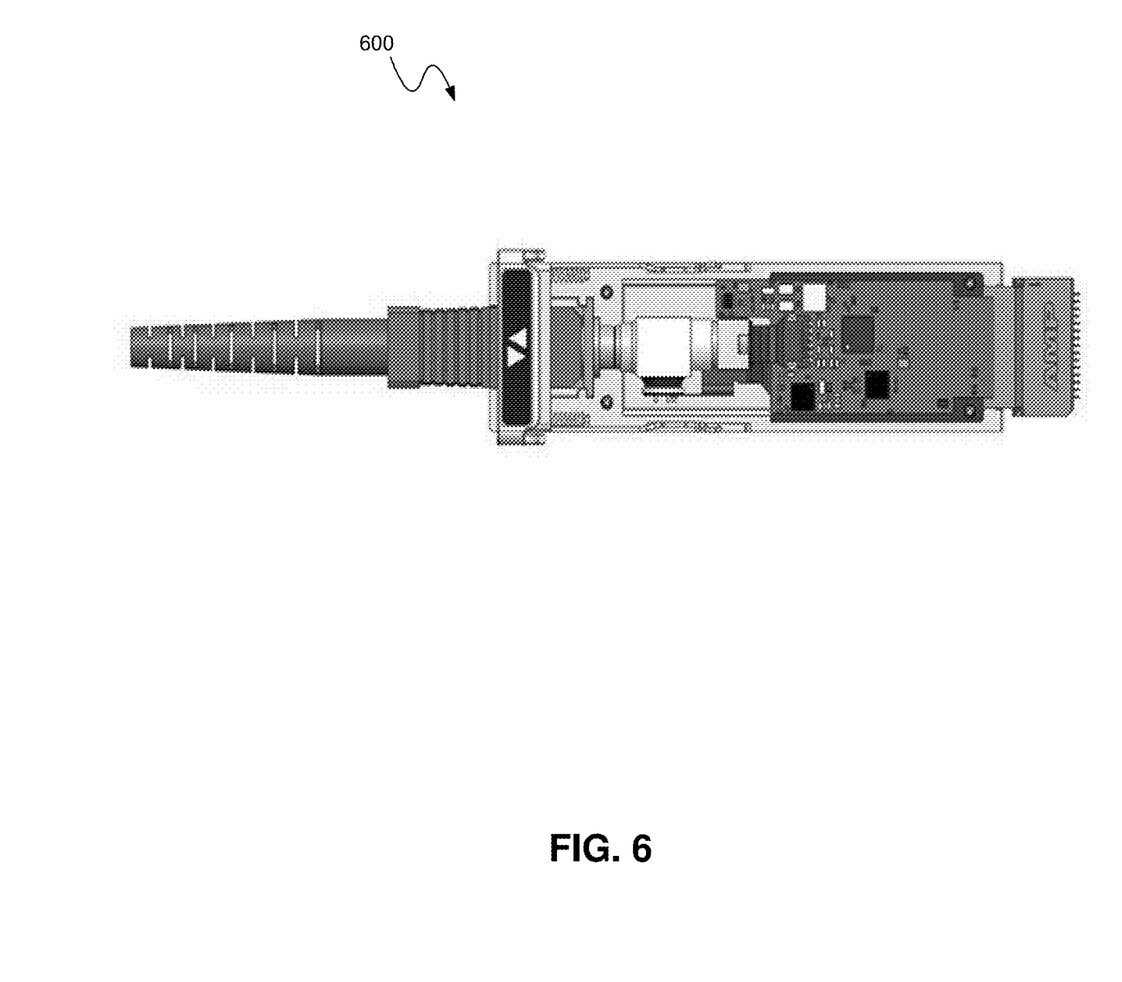
FIG. 6 shows an example optical transceiver in a Bidirectional Optical Sub-Assembly (BOSA) arrangement, in accordance with an embodiment of the present disclosure.

Although the following aspects and examples show and describe a multi-channel transceiver and housing conforming with a the QSFP28 form factor, other embodiments are within the scope of this disclosure. For example, the present disclosure is equally applicable to XFP form factor for purposes of, for example, providing a single-fiber Bidirectional Optical Sub-Assemblies (BOSAs). For example, FIG. 6 shows an example optical transceiver 600 in a BOSA arrangement. As shown in FIG. 6, the example optical transceiver 600 includes a locking arrangement consistent with the present disclosure and is configured to send and receive on a single fiber.

This embodiment of the optical transceiver 100 includes multiple transmitter optical subassemblies (TOSAs) 120a-d for transmitting optical signals on different channel wavelengths and a multi-channel receiver optical subassembly (ROSA) 130 for receiving optical signals on different channel wavelengths. The TOSAs 120a-d and the multi-channel ROSA 130 are located in a transceiver housing 102.

Returning to FIG. 1A, a transmit connecting circuit 104 and a receive connecting circuit 108 provide electrical connections to the TOSAs 120a-d and the multi-channel ROSA 130, respectively, within the housing 102. The transmit connecting circuit 104 is electrically connected to the electronic components (e.g., the laser, monitor photodiode, etc.) in each of the TOSAs 120a-d and the receive connecting circuit 108 is electrically connected to the electronic components (e.g., the photodiodes, the TIA, etc.) in the multi-channel ROSA 130. The transmit connecting circuit 104 and the receive connecting circuit 108 may be flexible printed circuits (FPCs) including at least conductive paths to provide electrical connections and may also include additional circuitry.

Each TOSA may be electrically coupled to conductive paths on the transmit connecting circuit 104 and be configured to receive driving signals (e.g., TX_D1 to TX_D4) and launch channel wavelengths on to fibers of the transmit optical fibers 122.

A multi-fiber push on (MPO) connector 110 provides optical connections to the TOSAs 120a-d and the multi-channel ROSA 130 within the housing 102. The MPO connector 110 is optically coupled to the TOSAs 120a-d and the multi-channel ROSA 130 via transmit optical fibers 122 and receive optical fibers 132, respectively. The MPO connector 110 is configured to be coupled to a mating MPO connector 112 such that the optical fibers 122, 132 in the optical transceiver 100 are optically coupled to external optical fibers 114.

Continuing on, this embodiment of the multi-channel ROSA 130 shown in FIG. 1A includes a photodetector array 134 including, for example, photodiodes optically coupled to a fiber array 133 formed by the ends of the receive optical fibers 132. The multi-channel ROSA 130 also includes a multi-channel transimpedance amplifier 136 electrically connected to the photodetector array 134. The photodetector array 134 and the transimpedance amplifier 136 detect and convert optical signals received from the fiber array 133 into electrical data signals (RX_D1 to RX_D4) that are output via the receive connecting circuit 108. Other embodiments of a ROSA may also be used in the transceiver 100 for receiving and detecting one or more optical signals.

This embodiment of the optical transceiver 100 does not include an optical multiplexer or demultiplexer. The optical signals may be multiplexed and demultiplexed external to the optical transceiver 100.

Figure 1B:
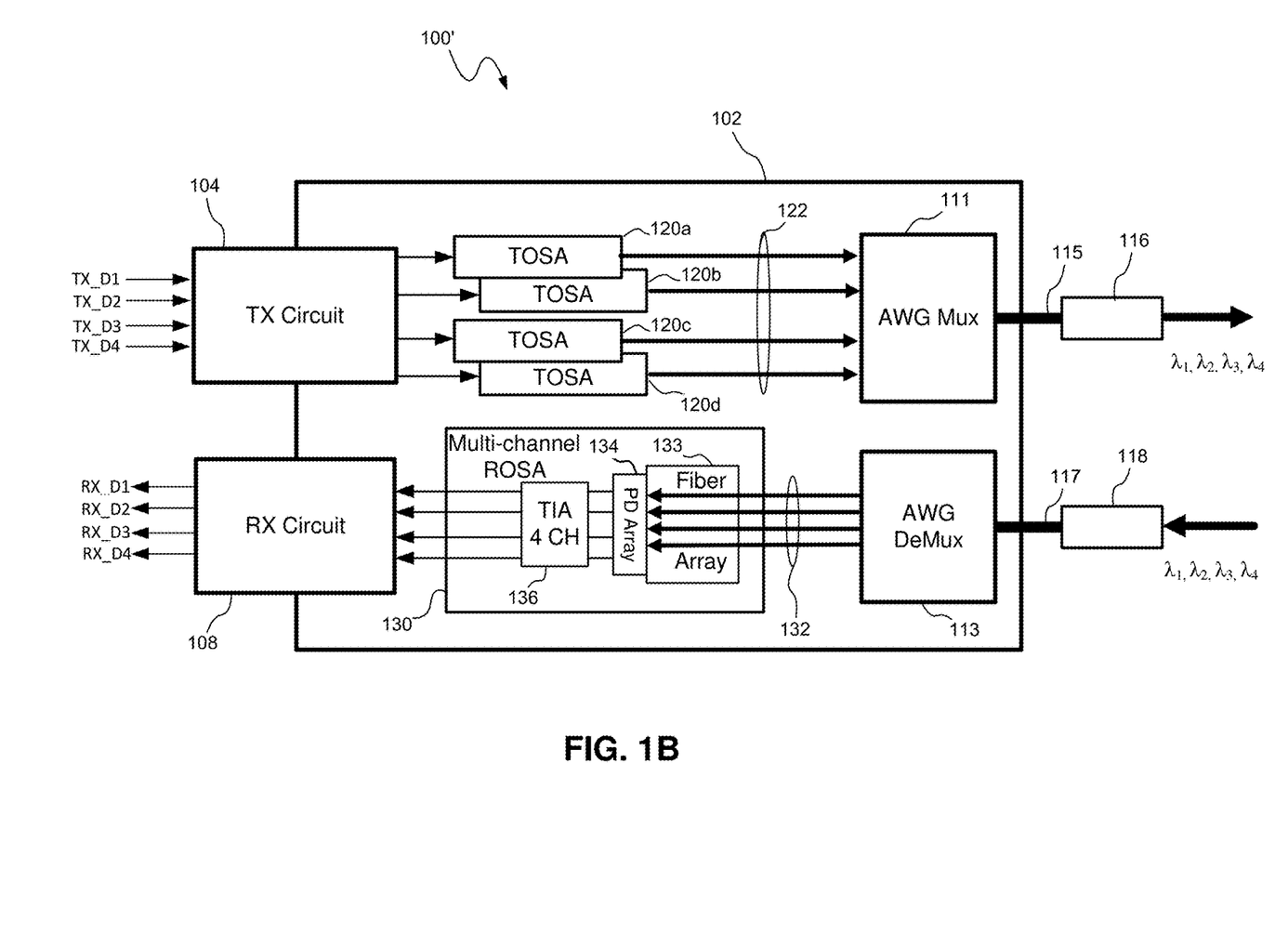

Referring to FIG. 1B, another embodiment of an optical transceiver 100' includes the same light engine (e.g., TOSAs 120a-d and ROSA 130) described above together with an optical multiplexer 111 and an optical demultiplexer 113. The optical multiplexer 111 and the optical demultiplexer 113 both may include arrayed waveguide gratings (AWGs). The optical multiplexer 111 is optically coupled to the transmit optical fibers 122 and the optical demultiplexer 113 is optically coupled to the receive optical fibers 132. The optical multiplexer 111 multiplexes the optical signals being transmitted over transmit optical fibers 122 to provide a multiplexed optical signal on an output optical fiber 115. The optical demultiplexer 113 demultiplexes a multiplexed optical signal received on an input optical fiber 117 to provide received optical signals on receive optical fibers 132. The output optical fiber 115 and the input optical fiber 117 are coupled to an output optical connector 116 and an input optical connector 118, respectively.

This embodiment of the optical transceiver 100' includes 4 channels and may be configured for coarse wavelength division multiplexing (CWDM), although other numbers of channels are possible. This embodiment of the optical transceiver 100' may also be capable of transmission rates of at least about 25 Gbps per channel and transmission distances of 2 km to at least about 10 km and may be used in internet data center applications or fiber to the home (FTTH) applications.

Figure 2:
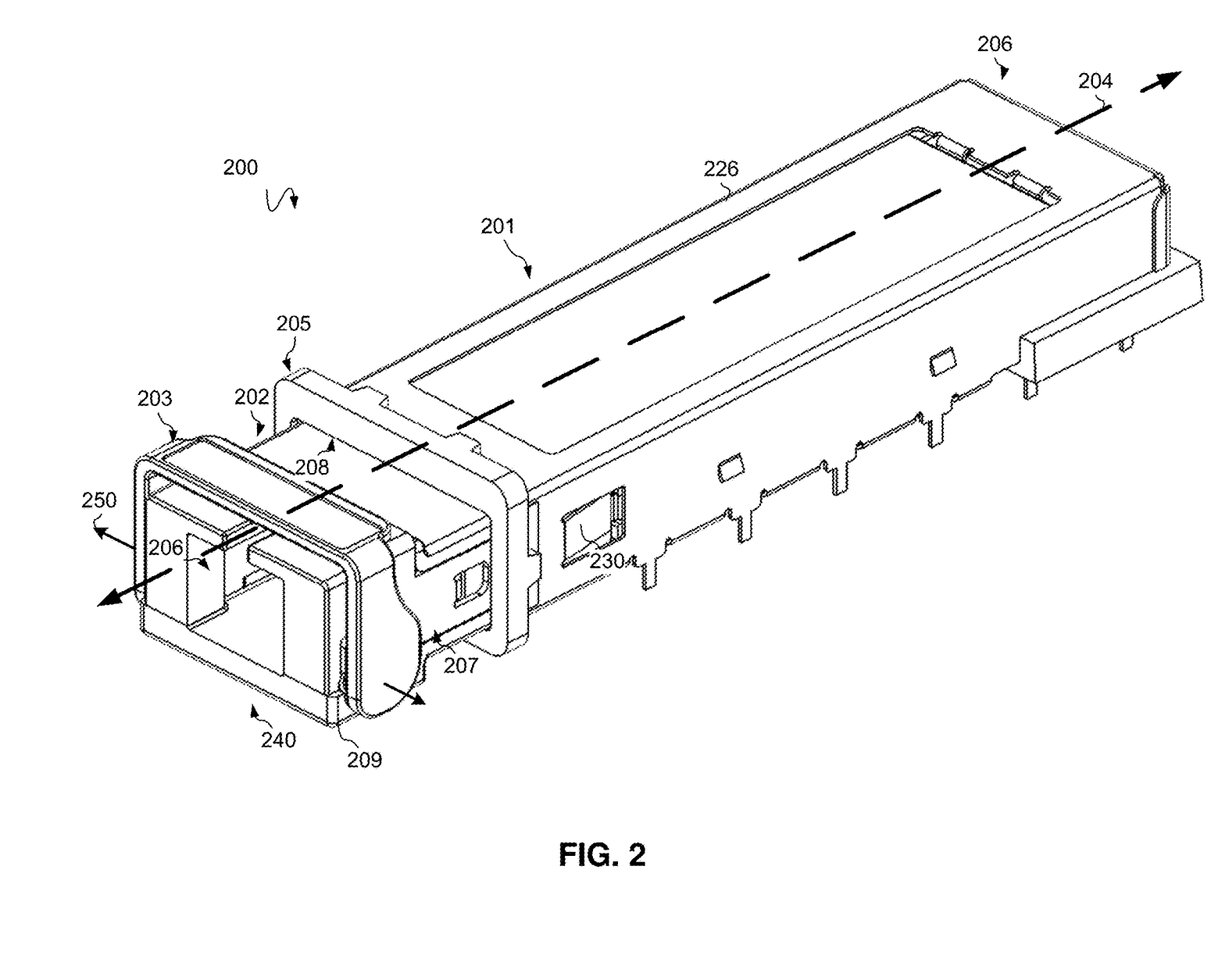
FIG. 2 is a perspective view of an optical transceiver system consistent with an embodiment of the present disclosure.
Figure 3:
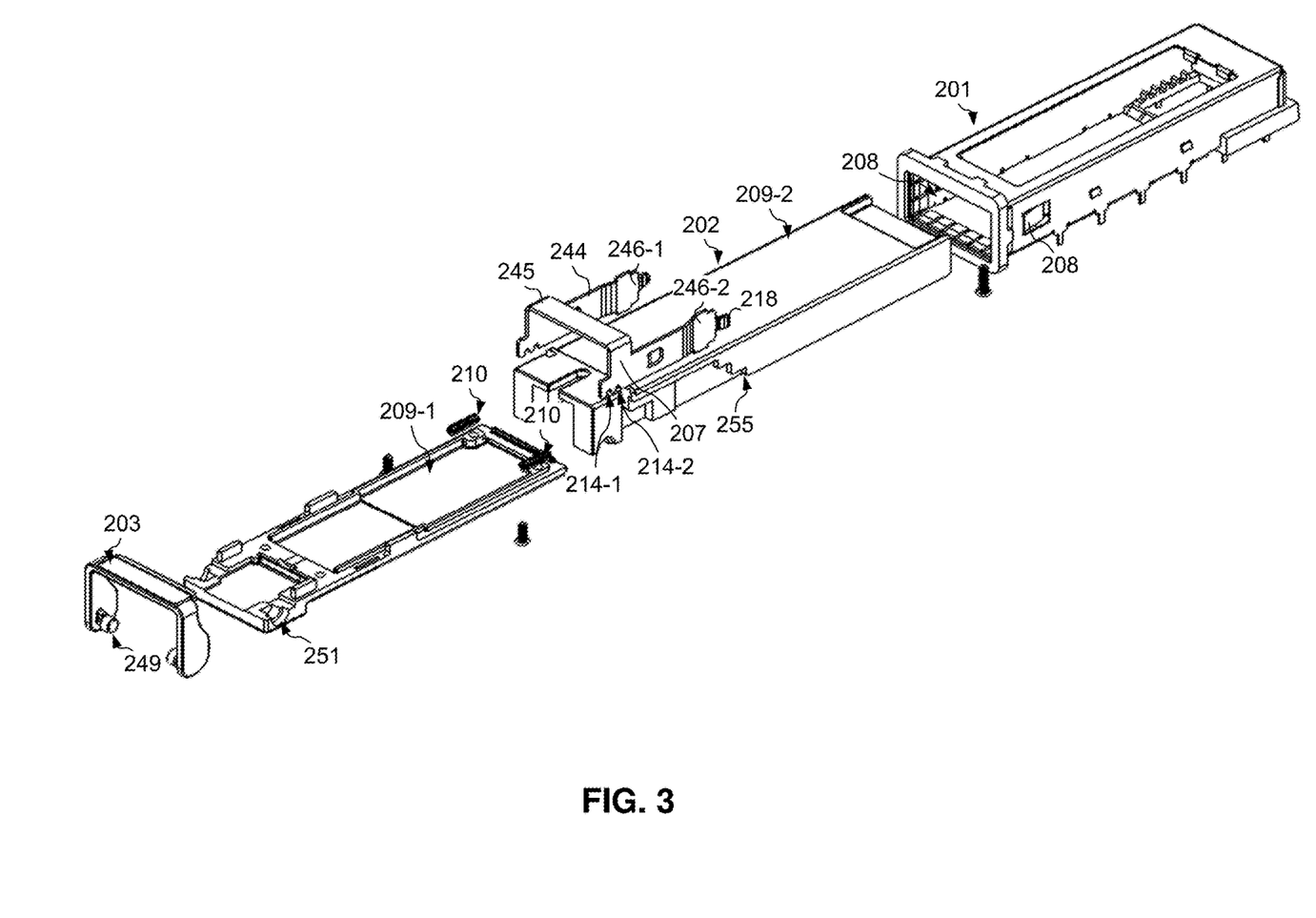
FIG. 3 is an exploded view of the optical transceiver system of FIG. 2 in accordance with an embodiment of the present disclosure.

FIGS. 2-3 show an optical communication system 200 in accordance with an embodiment of the present disclosure. The optical communication system 200 includes an optical transceiver cage 201 or cage 201 and an optical subassembly 202. The optical subassembly 202 may include optical components to provide a transmitter optical subassembly (TOSA) and/or receiver optical subassembly (ROSA). In an embodiment, the optical subassembly 202 is implemented as the optical transceiver module 100 or the optical transceiver module 100' as discussed above.

The cage 201 includes a body 226 or housing 226 that is defined by a plurality of sidewalls that extend from a first end 205 to a second end 206. The cage 201 may be formed from, for example, metal, plastic, or any other suitably rigid material. The first end 205 forms a receptacle 208 to at least partially receive the optical subassembly 202. The second end 206 may be utilized to electrically couple to a chassis or other housing (not shown). Thus, the first end may be referred to as an optical subassembly interface end and the second end may be referred to as an electrical coupling end.

The cage 201 further includes a locking member 230 or locking member 230 to engage a sidewall of the optical subassembly 202 to prevent removal when the same is inserted into the receptacle 208. The locking member 230 may be formed as a tab, such as shown in FIG. 2, or may be another structure/member suitable for releasably coupling to the optical subassembly 202.

As further shown, the optical subassembly 202 includes a base 209-1 and an upper portion 209-2 that may be configured to couple together to collectively form a subassembly housing 209 or housing 209. The housing 209 of the optical subassembly 202 may be formed from metal, plastic, or any other suitably rigid material. The housing 209 may extend from a first end 240 to a second end 241 along the longitudinal axis 204 when inserted into the receptacle 208. The first end 240 includes a coupling port for coupling to, for instance, an optical fiber and/or ferrule. The second end 241 may include an electrical interface such with one or more interconnect devices for electrically coupling to the cage 201.

The housing 209 may further include a locking arrangement 207. The locking arrangement 207 includes a handle member 203 and an actuating member 244. The handle member 203 may be configured to rotate about rotational axis 250 to transition the locking arrangement between a locked position and a release position, as discussed in further detail below. Note that the locked position and/or release position may not necessarily manifest as a single position for the handle 203 and actuating member 244; rather, a plurality of positions may constitute the locked and release positions depending on a desired configuration.

The handle member 203 may be contoured to substantially correspond with the shape of the optical subassembly 202. In a neutral/locked state, e.g., in the absence of a user-supplied force, the handle member 203 may remain in an upright position whereby a portion of the handle covers a top surface of the optical subassembly 202, such as shown in FIG. 2. The handle member 203 can include protrusions 249 that can include a cylindrical portion to allow for rotation when inserted into a corresponding opening 251 of the housing 209. The protrusions 249 may further include nodules/teeth 216-1 and 216-2 that may be configured to engage notches 214-1 and 214-2 (FIG. 5A) when transitioning the locking arrangement 207 between locked and release positions. Thus, the protrusions 249 may collectively form a gear-like structure that allows for translation of rotational movement by the handle member 203 into linear movement of the actuating member 244. As discussed in greater detail below, this linear movement of the actuating member 244 may be used to slidably disengage the locking member 230 of the cage to allow for removal of the optical subassembly 202 from the cage 201. The locking arrangement 207 may also be accurately referred to as a rack and pinion gearset.

Continuing on, the actuating member 244 may include a base 245 and first and second arm portions 246-1, 246-2 that extend substantially transverse relative to the base. The actuating member 244 may include a shape that generally conforms with the housing 209. The housing 209 may include a recess/channel 260 (FIG. 4) to receive at least the arms portions 246-1, 246-2 and allow the same to rest 'flush' against the sidewall of the housing 209. The channel 260 may also operate as a guide/track to keep the actuating member 244 in alignment when moving forward/back. Thus, the outer surfaces of the actuating member 244 may be disposed coplanar or recessed relative to the surfaces defining the housing 209 to advantageously provide low-profile mounting such that the width of the housing 209 remains relatively fixed/constant along the region to be inserted into the receptacle 208 (See FIG. 2).

The actuating member 244 includes grooves 214-1, 214-2 proximate the base 245 to engage/receive the teeth of the handle member 203. The actuating member 244 further includes retaining member 219 that extends into the track/recess 260 of the housing 209. As shown more clearly in FIG. 4, each spring 210 may be disposed within the track/recess 260 and may be configured to apply spring tension to retaining member 219 to displace the same towards the second end of the cage 201. This arrangement may therefore keep the actuating member 244 fixed in a rearward position, such as shown, which may also be referred to as a locked position.

The actuating member 244 further includes tabs 218 disposed at a distal end of each of the arm portions 246-1, 246-2 relative to the base 245. The tabs 218 include a generally arcuate portion that extends away from each of the associated arm portions 246-1, 246-2 such that a portion extends from the trace/guide 260. Thus, the tabs 218 may be raised and configured to displace the locking member 230 of the cage as the actuating member 244 transitions from the locked, rear-ward position to the forward release position as discussed below.

Figure 4:
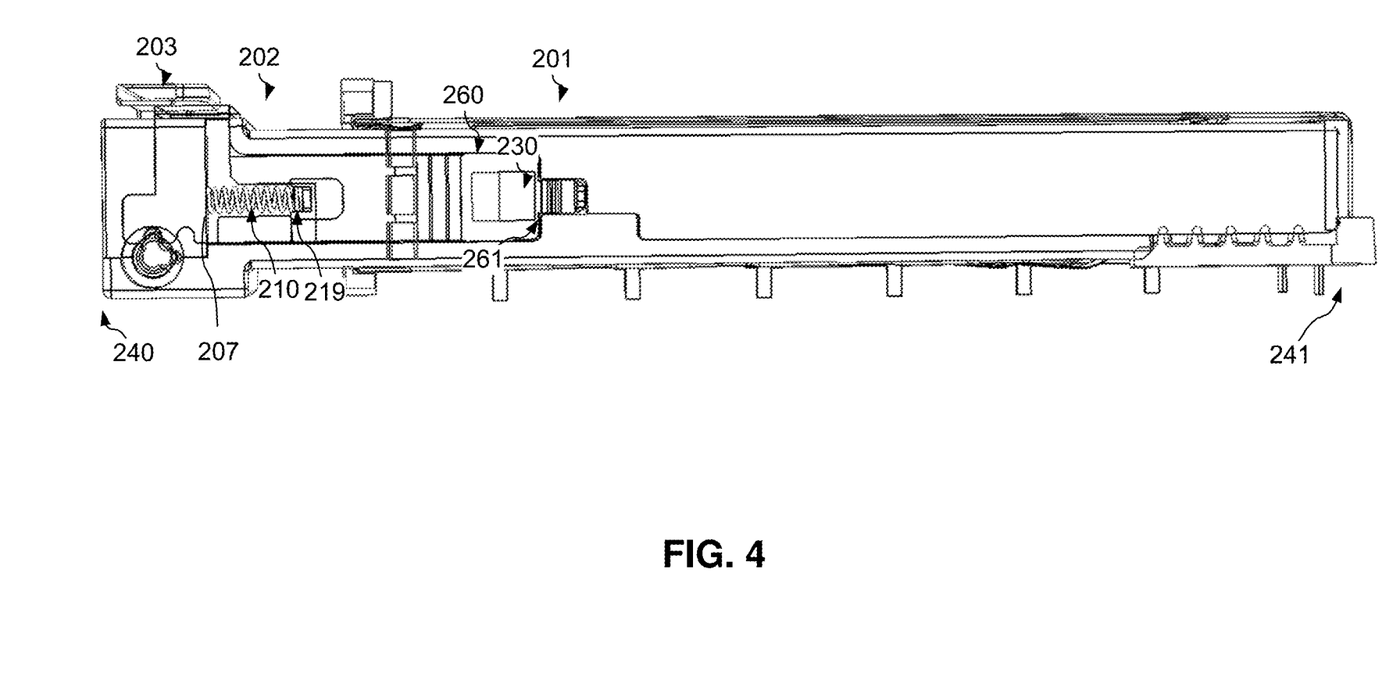
FIG. 4 shows a cross-sectional view of an optical subassembly module consistent with an embodiment of the present disclosure.
Figure 5A:
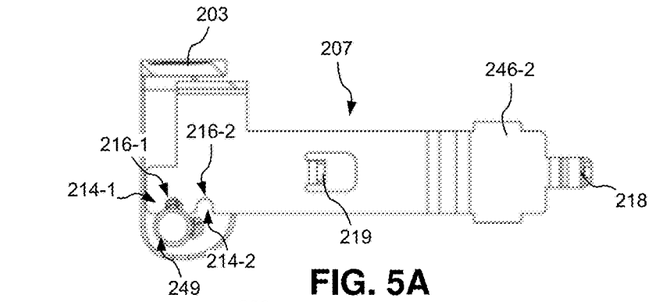
FIGS. 5A-5D collectively show an example locking arrangement suitable for use in the optical transceiver system of FIG. 2, in accordance with an embodiment of the present disclosure.

FIG. 4, with additional reference to FIGS. 5A-5D, shows a cross-sectional view of the optical device 200 in accordance with an embodiment. In FIG. 4, the optical subassembly 202 is shown inserted into the cage 201 and in a locked position. The locked position includes the lock member 230 abutting a wall 261 of the channel 260. The wall 261 may also be referred to as a stop. As discussed above, the spring 210 may supply a force to retaining member 219 to maintain position of the locking arrangement 207 in the locked position. As shown in FIG. 5A, the locked position includes the handle member 203 extending substantially transverse relative to the arms 246-1, 246-2. In this position, the tooth 216-1 may be disposed without the groove 214-1.

Figure 5B:
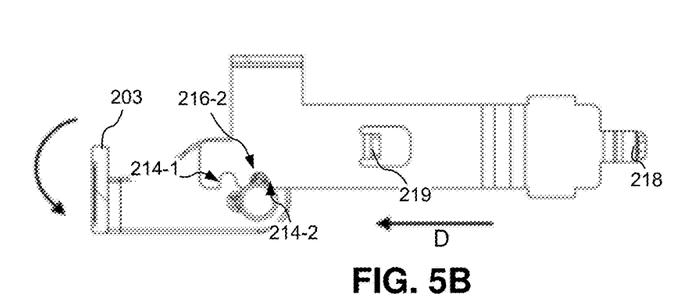
Figure 5C:
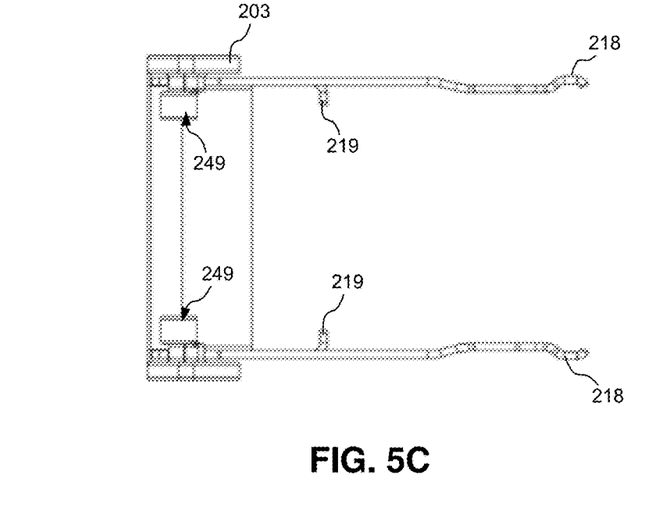
Figure 5D:
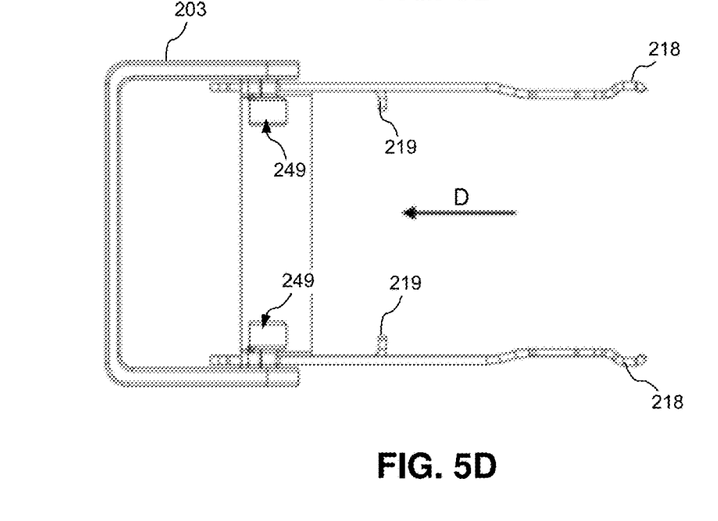

Continuing on, and to transition the locking arrangement 207 to the unlock position, a user may rotate the handle member 203, e.g., counter clockwise as shown. This rotation may then displace the actuating member 244 along direction D based on the tooth 216-1 urging the same by supplying force to the notch 214-1. After rotating about 45 degrees of rotation, the tooth 216-2 engages notch 214-2 which then continues to supply force sufficient to continue to cause linear movement of the actuating member 244 along direction D. As shown in FIG. 5B, after the handle member 203 rotates about 90 degrees, the actuating member 244 may then be brought to the release position. At around this release position ±20 degrees, the tabs 218 may displace the locking member 230 (FIG. 2) to allow for removal of the optical subassembly 202 from the cage 201. A user/technician may then pull or otherwise provide a force along direction D to remove the optical subassembly 202 from the cage 201.

In an accordance with an aspect of the present disclosure an optical transceiver module is disclosed. The optical transceiver module including a pluggable housing defining a cavity to receive an optical component, the pluggable housing configured to removably couple into a receptacle of an optical transceiver cage, and a locking arrangement coupled to the pluggable housing to allow the pluggable housing to releasably lock within the receptacle, the locking arrangement including a handle member to rotate about a first rotational axis to transition between a locked position and a release position, and an actuating member coupled to the handle member, the actuating member to translate rotational movement of the handle member about the first rotational axis to linear movement, and wherein the actuating member displaces a lock member of the receptacle when the handle member transitions to the release position.

In accordance with another aspect of the present disclosure, an optical transceiver system is disclosed. The optical transceiver system including a cage defining at least a first receptacle to receive an optical transceiver module, the cage including a lock member to releasably couple the housing into the first receptacle, and an optical transceiver module to releasably couple into the first receptacle, the optical transceiver module comprising a housing defining a cavity to receive an optical component, a locking arrangement coupled to the housing, the locking arrangement including a handle member, and wherein the handle member is configured to rotate to cause the locking arrangement to transition between a lock position and a release position, the release position to cause the lock member to allow the housing to decouple from the receptacle.

While the principles of the invention have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical transceiver module comprising:
   a pluggable housing defining a cavity to receive an optical component, the pluggable housing configured to removably couple into a receptacle of an optical transceiver cage; and
   a locking arrangement coupled to the pluggable housing to allow the pluggable housing to releasably lock within the receptacle, the locking arrangement including:
      a handle member to rotate about a first rotational axis to transition between a locked position and a release position, the handle member having at least a first protrusion, the first protrusion having at least first and second teeth extending therefrom; and
      an actuating member coupled to the handle member and having at least first and second notches, the actuating member to translate rotational movement of the handle member about the first rotational axis to linear movement based on the first and second teeth sequentially engaging with the first and second notches, respectively, to urge the actuating member along a direction D as the handle member rotates, and wherein the actuating member displaces a lock member of the receptacle when the handle member transitions to the release position.

2. The optical transceiver module of claim 1, wherein the actuating member includes first and second arm portions that extend substantially parallel with a longitudinal axis of the pluggable housing, and wherein the first arm defines the first and second notches.

3. The optical transceiver module of claim 1, wherein the pluggable housing defines a recessed region to receive at least a portion of the actuating member, the recessed region providing a guide for the linear movement of the actuating member.

4. The optical transceiver module of claim 3, wherein the actuating member includes a portion that extends from the recessed region to displace a lock member of the receptacle when the handle member transitions to the release position.

5. The optical transceiver module of claim 1, wherein the actuating member further includes at least one retaining member that extends towards the pluggable housing, and wherein the pluggable housing includes a spring member disposed within a cavity, the spring member including one end to supply a force against a sidewall defining the cavity and a second end to supply a force to a portion of the at least one retaining member that extends towards the pluggable housing and into the cavity to maintain the locking arrangement in a locked position.

6. The optical transceiver module of claim 1, wherein the optical component includes at least one laser diode and/or photodiode.

7. The optical transceiver module of claim 1, wherein the optical transceiver module is implemented as a quad small form-factor pluggable transceiver module capable of transmitting and receiving four different channel wavelengths.

8. The optical transceiver module of claim 1, wherein the first and second teeth sequentially engage the first and second notches, respectively, based in part on the first and second notches being disposed at a distance from each other along the actuating member such that, as the handle member rotates from the locked position to the release position, the first tooth engages the first notch to displace the actuating member a predetermined distance along direction D, the predetermined distance allowing for the second tooth to engage the second notch and further displace the actuating member along direction D as the handle member continues to rotate towards the release position.

9. The optical transceiver module of claim 1, wherein the first tooth engages with the first notch when the handle is in the locked position, and wherein the second tooth engages the second notch when the handle rotates about 45 degrees from the locked position.

10. An optical transceiver system comprising:
    a cage defining at least a first receptacle to receive an optical transceiver module, the cage including a lock member to releasably couple the housing into the first receptacle; and
    an optical transceiver module to releasably couple into the first receptacle, the optical transceiver module comprising:
       a housing defining a cavity to receive an optical component;
       a locking arrangement coupled to the housing, the locking arrangement including a handle member and an actuating member coupled to the handle, the handle member having at least a first protrusion having at least first and second teeth extending therefrom, and the actuating member including first and second notches to engage the first and second teeth, respectively; and
       wherein the handle member is configured to rotate to cause the locking arrangement to transition between a lock position and a release position based on the first and second teeth sequentially engaging with the first and second notches, respectively, to urge the actuating member along a direction D as the handle member rotates, the release position to cause the lock member to allow the housing to decouple from the receptacle.

11. The optical transceiver module of claim 10, the locking arrangement further comprising an actuating member, the actuating member configured to displace the locking member when the handle member transitions to the release position.

12. The optical transceiver module of claim 11, wherein the housing defines a recessed region to receive at least a portion of the actuating member and provide a guide for linear movement of the actuating member.

13. The optical transceiver module of claim 11, wherein the actuating member includes a retaining member that extends towards the housing, and wherein the housing includes a spring member to apply a force to a portion of the retaining member that extends towards the housing to urge the actuating member in a rearward position and maintain the handle member in the locked position.

14. The optical transceiver module of claim 10, wherein the optical transceiver module is implemented as a quad small form-factor pluggable transceiver module capable of transmitting and receiving four different channel wavelengths.

15. A method for releasably locking an optical transceiver module into an associated receptacle, the method comprising:
   rotating a handle member of an optical transceiver module from to a first position to cause a first tooth provided by the handle member to engage an associated first notch of an actuating member to displace the actuating member along a linear direction D;
   subsequent to rotating the handle member from the first position, rotating the handle member of the optical transceiver module to a second position, the second position to cause a second tooth provided by the handle member to engage a second notch of the actuating member, the second notch being different that the first notch, to displace the actuating member along the linear direction D to a release position; and
   disengaging a locking member in response to the actuating member being in the release position, wherein disengaging the locking member allows for the optical transceiver module to be removed by a pulling force along the linear direction D.

16. The method of claim 15, wherein rotating the handle member of the optical transceiver module to the second position includes rotating the handle member by 90±20 degrees from the first position.

17. The method of claim 15, wherein rotating the handle member from the first position further comprises disengaging the first tooth from the first notch.

* * * * *